United States Patent
Li et al.

(10) Patent No.: US 11,470,640 B2
(45) Date of Patent: Oct. 11, 2022

(54) DOWNLINK AND UPLINK TRANSMISSION METHODS AND DEVICES, BASE STATION, TERMINAL, AND STORAGE MEDIUM

(71) Applicant: ZTE CORPORATION, Shenzhen (CN)

(72) Inventors: Xincai Li, Shenzhen (CN); Yajun Zhao, Shenzhen (CN)

(73) Assignee: ZTE CORPORATION, Shenzhen (CN)

(*) Notice: Subject to any disclaimer, the term of this patent is extended or adjusted under 35 U.S.C. 154(b) by 165 days.

(21) Appl. No.: 16/980,533

(22) PCT Filed: Mar. 6, 2019

(86) PCT No.: PCT/CN2019/077070
§ 371 (c)(1),
(2) Date: Sep. 14, 2020

(87) PCT Pub. No.: WO2019/174499
PCT Pub. Date: Sep. 19, 2019

(65) Prior Publication Data
US 2021/0014894 A1    Jan. 14, 2021

(30) Foreign Application Priority Data
Mar. 12, 2018 (CN) .......................... 201810199973.0

(51) Int. Cl.
*H04W 72/12* (2009.01)
*H04W 74/08* (2009.01)

(52) U.S. Cl.
CPC ... *H04W 74/0808* (2013.01); *H04W 72/1268* (2013.01); *H04W 72/1273* (2013.01); *H04W 72/1289* (2013.01)

(58) Field of Classification Search
CPC ......... H04W 74/0808; H04W 72/1268; H04W 72/1273; H04W 72/1289; H04W 72/0453
See application file for complete search history.

(56) References Cited

U.S. PATENT DOCUMENTS

| | | | |
|---|---|---|---|
| 2018/0124790 A1* | 5/2018 | Yerramalli | ............ H04W 16/14 |
| 2019/0150182 A1* | 5/2019 | Koorapaty | ............ H04L 5/0094 |
| | | | 370/329 |
| 2019/0230706 A1* | 7/2019 | Li | ...................... H04W 72/0453 |

FOREIGN PATENT DOCUMENTS

| | | |
|---|---|---|
| CN | 105848165 A | 8/2016 |
| CN | 106658742 A | 5/2017 |
| WO | 2017066932 A1 | 4/2017 |

OTHER PUBLICATIONS

Vivo. "Potential solutions and techniques for NR unlicensed spectrum" 3GPP TSG RAN WG1 Meeting #92, R1-1801557, XP051396809, Feb. 15, 2018 (Feb. 15, 2018). sections 2-4, and figures 1-7 (Year: 2018).*

(Continued)

*Primary Examiner* — Lan-Huong Truong
(74) *Attorney, Agent, or Firm* — George McGuire

(57) ABSTRACT

Disclosed are a downlink transmission method and device, an uplink transmission method and device, a base station, a terminal, and a storage medium. The downlink transmission method includes: LBT processing is performed on at least one bandwidth unit resource, and at least one bandwidth unit resource of bandwidth unit resources on which results of the LBT processing result are successful is selected as a transmission bandwidth resource according to a result of the LBT processing; and a service transmission is performed to a terminal through the transmission bandwidth resource.

18 Claims, 5 Drawing Sheets

(56) References Cited

OTHER PUBLICATIONS

Translated Chinese Search Report.
Translated Chinese Office Action, dated Oct. 9, 2021. pp. 1-11.
Vivo. "Potential solutions and techniques for NR unlicensed spectrum" 3GPP TSG RAN WGI Meeting #92, RI-1801557, XP051396809, Feb. 15, 2018 (Feb. 15, 2018). sections 2-4, and figures 1-7.
Qualcomm Incorporated "Potential solutions and techniques for NR unlicensed" 3GPP TSG RAN WGI Metting #92, RI-1802865, XP051398278, Feb. 17, 2018 (Feb. 17, 2018), sections 1-3, and figures 1-8.
Huawei et al. "NR Numerology on unlicensed bands" 3GPP TSG RAN WGI Meeting #92, RI-1802723, XP051398156 Feb. 17, 2018 (Feb. 17, 2018), sections 2-4, and figures 1-4.
CATT "techniques for NR Unlicensed Operations" 3GPP TSG RAN WGI Meeting #92, RI-1801762, XP051397743, Feb. 17, 2018 (Feb. 17, 2018) entire document.
ZTE. "Framework on potential solutions and techniques for NR-U" 3GPP TSN RAN WGI Meeting #92, RI-1801466, XP051397565, Feb. 17, 2018 (Feb. 17, 2018) entire document.
Nokia et al. "Potential solutions and techniques for NR unlicensed" 3GPP TSG RAN WHI Meeting #92, RI-1802526, XP051397470, Feb. 16, 2018 (Feb. 16, 2018). entire document.
International Search Report Form PCT/ISA/210, International Application No. PCT/CN2019/077070 pp. 1-4 International Filing Date Mar. 6, 2019 dated Apr. 18, 2019.

\* cited by examiner

DOWNLINK AND UPLINK TRANSMISSION METHODS AND DEVICES, BASE STATION, TERMINAL, AND STORAGE MEDIUM

This is a National Stage Application, filed under 35 U.S.C. 371, of International Patent Application No. PCT/CN2019/077070, filed on Mar. 6, 2019, which claims priority to Chinese patent application No. 201810199973.0 filed with CNIPA on Mar. 12, 2018, contents of both of which are incorporated herein by reference in their entireties.

TECHNICAL FIELD

The present disclosure relates to the technical field of communications, and in particular to a downlink transmission method and device, an uplink transmission method and device, a base station, a terminal and a storage medium.

BACKGROUND

With the explosive growth of communication demand, spectrum resources are in increasing shortage. In order to meet the demand in the exponential growth, extra spectrum resources need to be added. Because authorized spectrum resources are limited, communication providers need to seek license-free spectrum resources, i.e., unauthorized spectrum resources. Compared with authorized carriers, unauthorized carriers have advantages of free/low cost, low access requirements, resource sharing, multiple radio access technologies, multiple sites and the like. The 3rd Generation Partnership Project (3GPP) technology has already studied a transmission operation of the unauthorized carriers.

Generally, Listen Before Talk, also referred to as LBT, or Clear Channel Assessment (CCA), is required before performing a service transmission using the unauthorized carriers. LBT processing refers to a process of listening to a carrier to be used for the service transmission and determining whether this carrier is idle and available. Only when a result of the LBT processing is successful, the apparatus can send data on the unauthorized carriers.

The traditional system carrier bandwidth is generally 20 megahertz (MHz), and the communication and transmission between apparatuses also basically uses a 20 MHz carrier to carry information. Therefore, in a traditional LBT mechanism, the LBT processing is rigidly performed by taking the system bandwidth as a minimum unit. However, with the development of the communication technology, a bandwidth value of the system bandwidth becomes larger and larger. In this case, if the LBT processing continues to be performed by taking the system bandwidth as the minimum unit, the success probability of LBT will be greatly reduced, and the performance and throughput of a communication system are affected. Therefore, there is an urgent need for a new LBT scheme.

SUMMARY

The present disclosure provides a downlink transmission method. The method includes: listen before talk (LBT) processing is performed on at least one bandwidth unit resource, where a bandwidth value of each bandwidth unit resource of the at least one bandwidth unit resource is less than a system bandwidth; at least one bandwidth unit resource of bandwidth unit resources on which results of the LBT processing are successful is selected as a transmission bandwidth resource according to a result of the LBT processing; and a service transmission is performed to a terminal through the transmission bandwidth resource.

The present disclosure further provides an uplink transmission method. The method includes: transmission scheduling information from a base station is received, and at least one bandwidth unit resource to be listened is determined according to the transmission scheduling information, where a bandwidth value of each bandwidth unit resource of the at least bandwidth unit resource is less than a system bandwidth; LBT processing is performed on the at least one bandwidth unit resource; at least one bandwidth unit resource of bandwidth unit resources on which results of the LBT processing are successful is adopted as a transmission bandwidth resource; and a service transmission is performed to the base station through the transmission bandwidth resource.

The present disclosure further provides a base station. The base station includes a first processor, a first memory and a first communication bus. The first communication bus is configured to implement a connection communication between the first processor and the first memory. The first processor is configured to perform a downlink transmission program stored in the first memory to implement the downlink transmission method described above.

The present disclosure further provides a terminal. The terminal includes a second processor, a second memory and a second communication bus. The second communication bus is configured to implement a connection communication between the second processor and the second memory. The second processor is configured to perform an uplink transmission program stored in the second memory to implement the uplink transmission method described above.

The present disclosure further provides a storage medium. The storage medium stores at least a downlink transmission program, and the downlink transmission program is executable by at least one processor to implement the downlink transmission method described above. Or, the storage medium at least stores an uplink transmission program, and the uplink transmission program is executable by at least one processor to implement the uplink transmission method described above.

DETAILED DESCRIPTION

Embodiments of the present disclosure will be described below by way of detailed description in conjunction with the accompanying drawings. It should be understood that the specific embodiments described herein are merely intended to explain the present disclosure, but not intended to limit the present disclosure.

Embodiment One

Figure 1:
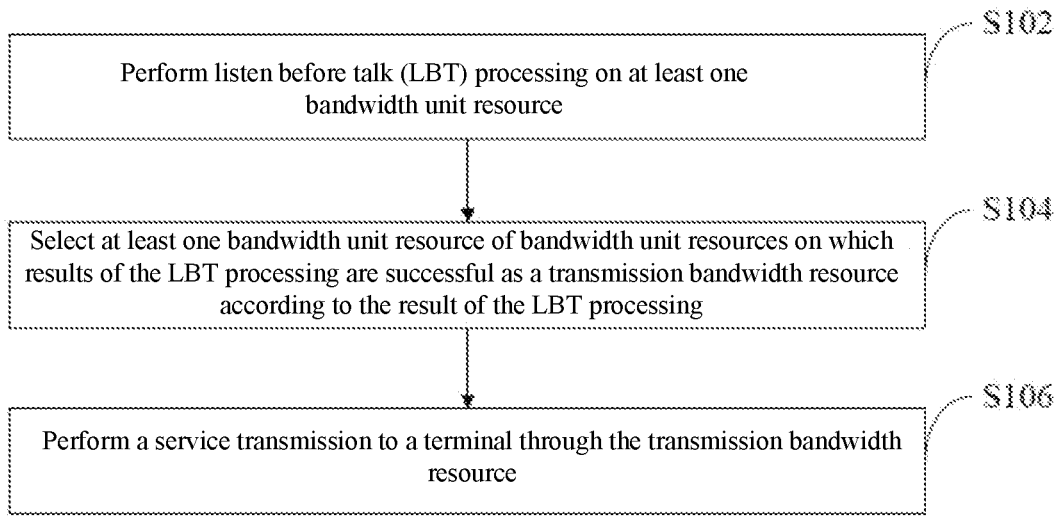
FIG. 1 is a flowchart of a downlink transmission method provided in an embodiment.

Due to a fact that in a traditional LBT mechanism, LBT processing is always rigidly performed by taking a system bandwidth as a minimum unit, if a result of the LBT processing is successful, the successful result represents that system bandwidth resources are not occupied currently and are all available, and once the result of the LBT processing is failure, the whole system bandwidth resources are not available for apparatuses performing the LBT processing. However, in a future communication system, the system bandwidth may be greatly improved. For example, in a Long Term Evolution (LTE) communication system, the system bandwidth is 20 MHz, but in an imminently deployed 5th-Generation (5G) communication system, a bandwidth value of the system bandwidth may reach 400 MHz, which negatively impacts the traditional LBT mechanism while providing faster communication speeds for a user: because in the 5G communication system, not all uplink and downlink communications use a full bandwidth, and more communications only use part of frequency bands in the system bandwidth resources, so that part of the frequency bands in the system bandwidth resources are in an idle available state under normal circumstances, and the idle frequency bands are optional frequency bands when a base station or a terminal has a transmission demand. However, if the LBT processing is performed on the whole system bandwidth resources according to the traditional LBT mechanism, a situation that the result of the LBT processing is failure due to a fact that part of the frequency bands in the system bandwidth resources are occupied may occur, so that remaining idle frequency bands in the system bandwidth resources cannot be effectively utilized, and meanwhile a service to be transmitted cannot be transmitted in time. This embodiment provides a downlink transmission method, which is introduced by a process that unauthorized spectrum resources are used for performing the service transmission at the base station. FIG. 1 is a flowchart of a downlink transmission method provided in an embodiment. Referring to FIG. 1, the downlink transmission method provided in this embodiment includes steps described below.

In S102, listen before talk (LBT) processing is performed on at least one bandwidth unit resource.

In order to avoid that the result of the LBT processing is large in failure probability when the LBT processing is performed on the full bandwidth of the system bandwidth resources, an object subjected to the LBT processing in this embodiment is the bandwidth unit resource, and a bandwidth value of the bandwidth unit resource is less than the system bandwidth. Herein the so-called bandwidth unit resource may include at least one of a bandwidth part (BWP) resource, a minimum system bandwidth resource, a resource block group (RBG), or a resource block (RB). In an embodiment, the BWP may be configured according to the support capability for the bandwidth at the terminal, and the bandwidth value of the BWP resource may be between a synchronous signal block (SSB) bandwidth value and a maximum bandwidth value supported by the terminal. There is already a concept of the resource block in a LTE communication system, one resource block has a bandwidth value of 180 kilohertz (kHz), consisting of 12 subcarriers with a bandwidth of 15 kHz. The resource group consists of at least two resource blocks.

It should be understood that specific examples of the several bandwidth unit resources described above are not the only forms of the bandwidth unit resource in this embodiment, and that the bandwidth unit resource may also be a spectrum resource such as a sub-band with a bandwidth value less than the system bandwidth, in addition to a BWP resource, the minimum system bandwidth resource, a RBG, a RB.

The LBT mechanism includes multiple processing types, such as LBT processing of a random backoff type and LBT processing of a non-random backoff type. The LBT processing of the non-random backoff type includes LBT processing of a type 2, the LBT processing of the type 2 means that a sending end may perform an idle sensing on a channel to be used within a period of time (such as 9 microseconds (us) or 16 us, or 25 us, etc.) before performing the service sending, and if the channel is determined to be idle through the sensing within the period of time, then the service transmission may be performed. The LBT processing of the random backoff type includes LBT processing of a type 4, for the LBT processing of the type 4, a contention window [0, CW] with a variable size is provided, and the sending end randomly obtains a numerical value n from the contention window as a backoff value, so that a maximum value of the backoff value n does not exceed a maximum value CW of the contention window. The backoff value n may determine a number of times of monitoring or idle sensing when the sending end performs the LBT processing, and for the LBT processing with the backoff value n, the idle sensing is performed for n+1 times. Only when the n+1 times of idle sensing determine that the channel to be used is idle, the LBT processing is successful. The LBT processing of the non-random backoff type only performs the sensing once, so that the LBT processing is short in time consumption and is suitable for being performed before a transmission with strict requirements on the time efficiency. However, the LBT processing of the random backoff type may perform multiple times of listening, so that the reliability is higher although much time is consumed. In some examples of this embodiment, the LBT processing of the non-random backoff type may also include LBT processing of a type 3. The LBT processing of the type 3 has a fixed size contention window, from which the sending end may obtain the backoff value n. In this embodiment, the LBT processing of the random backoff type including the LBT processing of the type 4 is mainly taken as an example for introduction, thus the LBT processing on the bandwidth unit resource in this embodiment is mainly divided into the LBT processing of the type 2 and the LBT processing of the type 4.

Since a type of the LBT processing performed on the bandwidth unit resource is not unique, before the LBT processing is performed on the bandwidth unit resource, a corresponding LBT processing type should be determined for the bandwidth unit resource. The following introduces primarily how to determine the type of the LBT processing when there are at least two bandwidth unit resources.

Scheme one, the LBT processing of the random backoff type is selected for each bandwidth unit resource.

Since the LBT processing of the random backoff type in this embodiment is actually the LBT processing of the type 4, in this scheme, the LBT processing performed on each bandwidth unit resource is the LBT processing of the type 4. For the LBT processing of the type 4, a contention window needs to be determined first, and then a corresponding backoff value n may be determined according to a size of the contention window. Two schemes for determining the contention window and the backoff value are provided in this embodiment.

First scheme, corresponding contention windows and backoff values are determined respectively for the at least two bandwidth unit resources, that is, the contention windows and the backoff values on which the at least two bandwidth unit resources are based upon performing the LBT processing of the type 4 are not uniform. In one example of this embodiment, for each bandwidth unit resource, a base station may determine a contention window value for performing the LBT processing of the random backoff type on the bandwidth unit resource according to an access priority of a service intended to be transmitted on this bandwidth unit resource, and then randomly determine a corresponding backoff value based on the contention window. Assuming that in one example, for three bandwidth unit resources, the LBT processing of the type 4 is selected to be performed, the base station determines that a contention window belonging to the bandwidth unit resource is [a1, a2] according to a service to be transmitted on the first bandwidth unit resource, and then determines a backoff value n1 belonging to a first LBT of the first bandwidth unit resource from [0, a1], so that in this LBT processing, for the first bandwidth unit resource, the operation will be performed according to the backoff value n1; for a second bandwidth unit resource, the base station determines that a contention window belonging to this bandwidth unit resource is [a2, a3] according to a service to be transmitted on the second bandwidth unit resource, and then determines a backoff value n2 belonging to the first LBT of the second bandwidth unit resource from [0, a2], so that in this LBT processing, for the second bandwidth unit resource, the operation will be performed according to the backoff value n2. A third bandwidth unit resource is also similar, which will not be detailed herein again.

A manner to determine the contention window based on the access priority of the service is provided below, please see table 1 described below.

TABLE 1

| access priority (p) | minimum contention window ($CW_{min}$) | maximum contention window ($CW_{max}$) | maximum channel occupancy time (ms) | optional value of size contention window |
|---|---|---|---|---|
| 1 | 3 | 7 | 2 | {3, 7} |
| 2 | 7 | 15 | 3 | {7, 15} |
| 3 | 15 | 63 | 6 or 8 | {15, 31, 63} |
| 4 | 15 | 1023 | 8 or 10 | {15, 31, 63, 127, 255, 511, 1023} |

Corresponding relations between the access priority of the service on the channel and the minimum value of the contention window (CW) value, the maximum value of the contention window (CW) value, the maximum channel occupancy time (MCOT) as well as the optical value of the contention window CW are stored in the table 1, and if it is determined that a contention window for a certain bandwidth unit resource is determined according to the access priority of a certain service, the contention for the certain bandwidth unit resource is determined according to the table 1 or other corresponding relations similar to the table 1, and the size of the contention window at each time is maintained according to this access priority. For example, if an access priority of the service to be transmitted on the first bandwidth unit resource is 2, then a value of the CW contention window may be 7 or 15; if an access priority of the service intended to be transmitted on the second bandwidth unit resource is 4, then a value of the CW contention window may be 15, 31, 63, 127, 255, 511, 1023.

In the LBT of the type 4, there will be a process of adjusting the contention window, and an initial value of the contention window is the minimum contention window determined according to a service or a channel access level, i.e., the CWmin value corresponding to the service priority. In a case where a number of times that the channel is busy is detected or a proportion of non-acknowledgement (NACK) received by a reference sub-frame exceeds a predefined value, the contention window is increased to a next value, and a final contention window cannot exceed the maximum contention window.

In an embodiment, there is sometimes more than one service that needs to be transmitted on a same bandwidth unit resource, while different services have different access priorities, in this case an access priority of one service needs to be selected to determine the contention window. According to this embodiment, the contention window is determined according to the access priority corresponding to the service of the highest access priority. For example, the service to be transmitted on the first bandwidth unit resource includes A service, B service, and C service with access priorities of 2, 3, and 3, respectively, and thus in the three services, the service of the highest access priority is the service A, and the access priority is 2, and a value of the CW may be 7 or 15 in this case.

For a condition that the at least two bandwidth unit resources select to perform the LBT processing of the random backoff type, in the foregoing scheme, a scheme of respectively determining a contention window and a backoff value for the at least two bandwidth unit resources is provided, and another scheme of determining a common contention window and a common backoff value for the at least two bandwidth unit resources is provided below.

Second scheme, the base station determines a contention window for performing the LBT processing of the random backoff type on all bandwidth unit resources according to the access priority of the service to be transmitted on the at least two bandwidth unit resources, and determines a backoff value belonging to the all bandwidth unit resources according to the contention window. Unlike the first scheme, in this scheme, at least two bandwidth unit resources have a uniform contention window and backoff value, that is, the contention windows and backoff values of the at least two bandwidth unit resources are the same. The base station may select a service of the highest access priority from the service to be transmitted on the at least two bandwidth unit resources, and then determine the contention window based on the access priority corresponding to the service and a corresponding relation between the access priority and the CW optional value. For example, there are 4 bandwidth unit resources, and the types of the LBT processing selected by the base station for these 4 bandwidth unit resources are all of the random backoff type. In this case, the base station may determine a service with the highest priority from the service to be transmitted on the 4 bandwidth unit resources, for example, the service to be transmitted on the first bandwidth unit resource includes A and B, and services C, D, E are respectively prepared to be transmitted on the second bandwidth unit resource, the third bandwidth unit resource, and a fourth bandwidth unit resource, and access priorities of the 5 services are respectively 5, 4, 2, 2 and 1. By comparison, the base station may determine that a service with the highest priority of the service to be transmitted on the four bandwidth unit resources is the service E, and an access priority of the service E is 1, and thus a value of the CWp may be 3 or 7. After the contention window is determined, the base station may determine a corresponding backoff value n from the contention window, where the determined contention window and backoff value are for the all bandwidth unit resources, and thus, once the backoff value is determined, the LBT processing on each bandwidth unit resource is performed according to this backoff value.

In the scheme one, at least two bandwidth unit resources are performed the LBT processing of the random backoff type, and the result of the LBT processing of the random backoff type has high reliability, so that the reliability of a final result of the LBT may be ensured according to the LBT type determined in the scheme one.

Scheme two, the LBT processing of the random backoff type is selected for one of the at least two bandwidth unit resources, and the LBT processing of the non-random backoff type is selected for the rest bandwidth unit resource.

The base station may select one of the multiple bandwidth unit resources to perform the LBT processing of the random backoff type in any one of following manners: one bandwidth unit resource with worst channel state information (CSI) is selected from the at least two bandwidth unit resources, or one bandwidth unit resource with a service to be transmitted of a highest access priority is selected from the at least two bandwidth unit resources. In a case where the CSI of the bandwidth unit resource is poor or the access priority of the service to be transmitted is high, the base station is required to ensure that the result of the LBT processing on the bandwidth unit resource is reliable, therefore in these two cases, the LBT processing of the random backoff type may be selected to ensure the reliability the result of the LBT, and therefore, one bandwidth unit resource with worst channel state information (CSI) is selected from the at least two bandwidth unit resources as the bandwidth unit resource for performing the LBT processing of the random backoff type; or one bandwidth unit resource with a service to be transmitted of a highest access priority is selected from the at least two bandwidth unit resources as the bandwidth unit resource for performing the LBT processing of the random backoff type.

In addition to the above two manners, the base station may also determine which bandwidth unit resource is performed the LBT processing of the random backoff type through other manners: for example, the base station selects in a uniform random manner. Uniform randomness means that the probability that the at least two bandwidth unit resources are selected is uniform. In some examples of this embodiment, when selecting in the random selection manner, the base station may ensure that the selected bandwidth unit resource on which the LBT processing of the random backoff type is performed at a previous time is not selected. For example, objects of the LBT processing performed by the base station at the previous time are BWPs with sequence numbers 1, 2, 3, and 4, where the BWP with a sequence number 2 is selected to perform the LBT processing of the random backoff type. Assuming that objects of this LBT processing are BWPs with sequence numbers 2, 3, 4, and 5, the base station should ensure that the BWP with the sequence number 2 may no longer be selected to perform the LBT processing of the random backoff type.

In consideration of a fact that much information sent by a base station to a terminal side is transmitted on a bandwidth unit resource which is initially activated or activated by default, in order to fully ensure the reliability of the result of the LBT processing on the bandwidth unit resource, the base station may also select the bandwidth unit resource which is initially activated or activated by default as the bandwidth unit resource for performing the LBT processing of the random backoff type.

It has been previously mentioned that the contention window may be adjusted in some cases upon performing the LBT of the type 4 on bandwidth unit resources, in one example of this embodiment, if a total proportion P of NACK responses corresponding to a physical downlink shared channel (PDSCH) received by the all bandwidth unit resources in a reference time slot exceeds a preset threshold value, the contention window of the selected bandwidth unit resources on which the LBT processing of the random backoff type is performed is adjusted. In an embodiment, $$p = \frac{\text{a number of the } NACK \text{ responses}}{\text{the number of the } NACK \text{ responses} + \text{a number of acknowledgement } (ACK) \text{ responses}}.$$

For example, in one example of this embodiment, the preset threshold value is 0.5, assuming that there are four bandwidth unit resources in total, the acknowledgement received by three of the four bandwidth unit resources is the NACK acknowledgement, and the acknowledgement received by only one bandwidth unit resource is the ACK acknowledgement, thus P=3/(3+1)=0.75. Due to a fact that a size of the P exceeds the preset threshold value, the contention window value of the bandwidth unit resource for performing the LBT processing of the random backoff type needs to be adjusted, the adjustment generally refers to the enlargement of the contention window, and a value larger than the current contention window value is selected from the CW optional value as a new contention window.

The following introduces a contention window adjustment strategy when multiple bandwidth unit resources bear multiple services: the base station may determine the highest access priority of the access priority according to the access priority of the service to be transmitted on all bandwidth unit resources; and the contention window of the bandwidth unit resource is adjusted according to the contention window adjustment strategy corresponding to the highest access priority.

Scheme three, the LBT processing of the random backoff type and the LBT processing of the non-random backoff type are selected in an interlaced manner for the at least two bandwidth unit resources.

In one example of this embodiment, the base station, when determining the type of the LBT processing on the multiple bandwidth unit resources, may select the LBT processing of the random backoff type and the LBT processing of the non-random backoff type in the interlaced manner for the at least two bandwidth unit resources, e.g., the bandwidth unit resources include BWP1, BWP2, BWP3, BWP4, BWP5, BWP6, and the base station may select the BWP1, the BWP3, the BWP5 to perform the LBT processing of the random backoff type, and select the BWP2, the BWP4, the BWP6 to perform the LBT processing of the non-random backoff type.

Considering that only SSB information needs to be transmitted when the base station performs the service transmission to a terminal side, and the SSB information has a high requirement for transmission timeliness, this embodiment further provides following schemes of determining the LBT type for the bandwidth unit resources.

Scheme four, in a case where the information to be transmitted to the terminal only includes synchronous signal block (SSB) information, the LBT processing of the non-random backoff type is selected for the at least two bandwidth unit resources.

In S104, at least one bandwidth unit resource of bandwidth unit resources on which results of the LBT processing are successful is selected as a transmission bandwidth resource according to the result of the LBT processing.

Due to a fact that the supporting capacities of the terminal side to the transmission bandwidth are different, after the base station finishes the LBT processing on the at least one bandwidth unit resource, at least one bandwidth unit resource may be selected from the bandwidth unit resources on which the results of the LBT processing are successful as the transmission bandwidth resource.

Typically, a number of the bandwidth unit resources selected by the base station to constitute the transmission bandwidth resource is related to support capability of the terminal side for the transmission bandwidth, and a number of the bandwidth unit resources on which the results of the LBT processing are successful.

For example, in some cases, the support capability of the terminal for the transmission bandwidth is fixed and limited, in this case, a sum of the bandwidths of the bandwidth unit resources selected by the base station for constituting the transmission bandwidth resource does not exceed the support capability of the terminal for the transmission bandwidth. Moreover, in a case where the support capability of the terminal to the transmission bandwidth is flexible, the number of the bandwidth unit resources which are selected by the base station and are used for constituting the transmission bandwidth resource does not exceed the number of the bandwidth unit resources on which the results of the LBT processing are successful.

In S106, a service transmission is performed to a terminal through the transmission bandwidth resource.

After the transmission bandwidth resource is determined, the base station may perform the service transmission to the terminal by adopting the transmission bandwidth resource.

According to the downlink transmission method provided by this embodiment, the LBT processing is performed by taking the bandwidth unit resource as the unit, and the bandwidth value of the bandwidth unit resource is less than the system bandwidth, so that when the base station needs to use the unauthorized spectrum resources to perform the downlink data transmission to the terminal, the LBT processing does not need to be performed on the whole system bandwidth resources; and it can avoid that the downlink transmission of the base station for the certain terminal may not be performed, and the system throughput and the user experience at the terminal side are affected because the LBT processing on the system bandwidth resources is failure due to the other part of frequency band is occupied when the part of frequency band in the system bandwidth resources is idle and may be used for the downlink transmission.

According to the downlink transmission method provided by this embodiment, the LBT processing is performed on the bandwidth unit resource with the bandwidth value less than the system bandwidth, so that the success probability of the LBT processing is improved, and thus in a case where system hardware facilities are not changed, the downlink throughput is improved, the system performance is guaranteed, and the communication experience of a terminal side user is maintained. In addition, various manners for determining the type of the LBT processing on the bandwidth unit resource are provided in this embodiment, so that the base station may flexibly select the appropriate LBT processing type for the bandwidth unit resource according to factors such as service transmission requirements, and the flexibilities of the downlink transmission and the LBT processing before the downlink transmission are improved.

Embodiment Two

This embodiment will continue to introduce the downlink transmission method on the basis of the embodiment one.

In the embodiment one, after the base station performs the LBT processing on at least one bandwidth unit resource, at least one bandwidth unit resource is selected from the bandwidth unit resources on which the results of the LBT processing are successful according to the support capability of the terminal side for the transmission bandwidth and the number of the bandwidth unit resources on which the results of the LBT processing are successful, to constitute the transmission bandwidth resource. In this embodiment, although the support capability of the terminal side to the transmission bandwidth and the number of the bandwidth unit resources on which the results of the LBT processing are successful are direct determinant factors of selection of the bandwidth unit resources, however, actually, since a number of bandwidth unit resources participating in listening may influence the number of the bandwidth unit resources on which the results of the LBT processing are successful, so that the number of the bandwidth unit resources participating in listening may also have a certain influence on the composition of the transmission bandwidth resource. Processes of the downlink transmission method in the embodiment one are set out in combination with several examples below: the LBT processing is performed on the at least one bandwidth unit resource, and the at least one bandwidth unit resource of the bandwidth unit resources on which the results of the LBT processing are successful is selected as the transmission bandwidth resource according to the result of the LBT processing.

Figure 2:
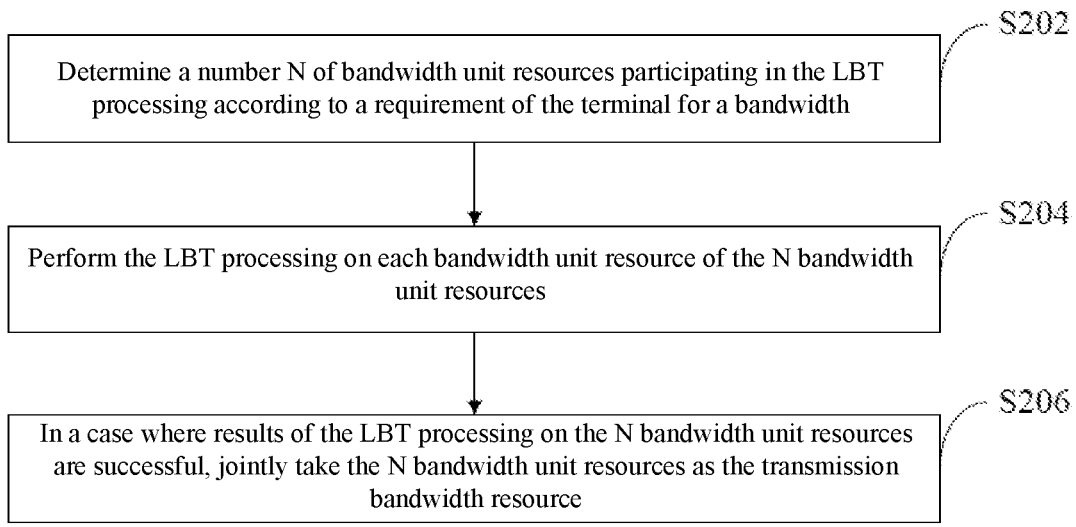
FIG. 2 is a flowchart of a scheme of LBT processing and determination of a transmission bandwidth resource provided in an embodiment.

Firstly, a case that the supporting capability of the transmission bandwidth is fixed and limited at the terminal side is introduced, referring to a flowchart of LBT processing and determination of a transmission bandwidth resource provided in FIG. 2.

In S202, a number N of bandwidth unit resources participating in the LBT processing is determined according to a requirement of the terminal for a bandwidth.

Here, N is an integer greater than or equal to 1, and a sum of bandwidth values of the N bandwidth unit resources is equal to a bandwidth value of a final transmission bandwidth resource, such as k MHz. Therefore, in such a scheme, it has been possible to determine which bandwidth unit resources participating in the transmission are if service transmission is to be made, even if the LBT processing has not been started.

In S204, the LBT processing is performed on each bandwidth unit resource of the N bandwidth unit resources.

In this example, the type of the LBT processing upon performing the LBT processing on the each bandwidth unit resource may be determined according to the scheme introduced in embodiment one, which will not be detailed herein again.

In S206, in a case where results of the LBT processing on the N bandwidth unit resources are successful, the N bandwidth unit resources are jointly taken as the transmission bandwidth resource.

In this embodiment, if any one or more results of the LBT processing in the N bandwidth unit resources are failure, the transmission bandwidth resource meeting the requirements may not be finally constituted, so that the service transmission is not performed temporarily.

Figure 3:
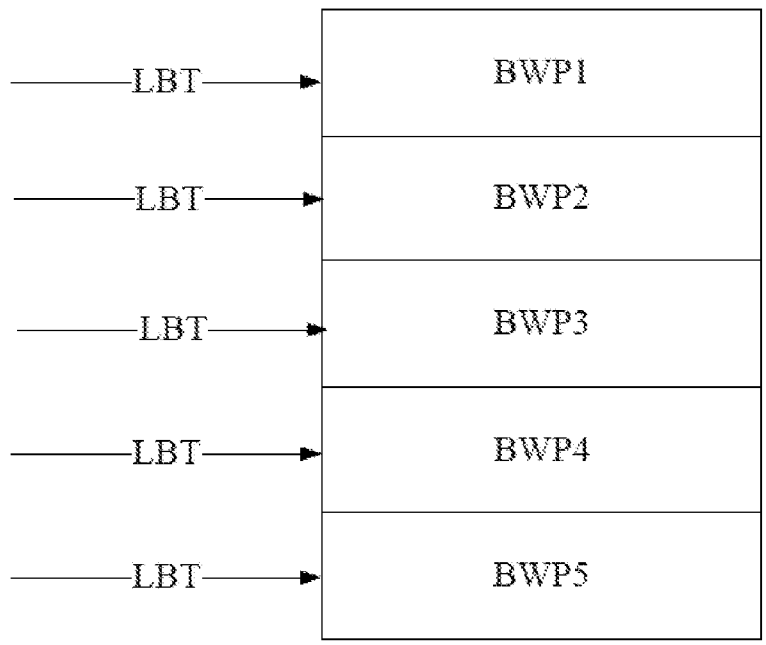
FIG. 3 is a schematic diagram of LBT processing on multiple bandwidth parts (BWPs) provided in an embodiment.

Assuming that the transmission bandwidth supported by the terminal is fixed at 75 MHz, at this time, the base station will only perform the LBT processing on the bandwidth unit resources constituting the 75 MHz transmission bandwidth, for example, the bandwidth unit resources constituting the transmission bandwidth resource are BWP1 . . . BWP5, as shown in FIG. 3. The bandwidth value of each BWP is 15 MHz. The base station may perform the LBT processing on the BWP1 . . . BWP5 respectively, if results of the LBT processing on these five bandwidth unit resources are successful, these five bandwidth parts may directly constitute the transmission bandwidth resource for performing downlink transmission on the service, but if a result of the LBT processing on at least one bandwidth unit resource of the five bandwidth unit resources is failure, then it is indicated that no bandwidth unit resource constituting the transmission bandwidth exists at present, so that the service transmission is not performed temporarily.

In this embodiment, the base station respectively performs the LBT processing on the at least two bandwidth unit resources means that a result of the LBT processing on one bandwidth unit resource does not affect the LBT processing process of another bandwidth unit resource in the LBT processing process, but the time sequence of performing the LBT processing on the at least two bandwidth unit resources is not limited in this embodiment; namely, the LBT processing on the at least two bandwidth unit resources may be performed at the same time, and may also be performed step by step according to a certain sequence.

Figure 4:
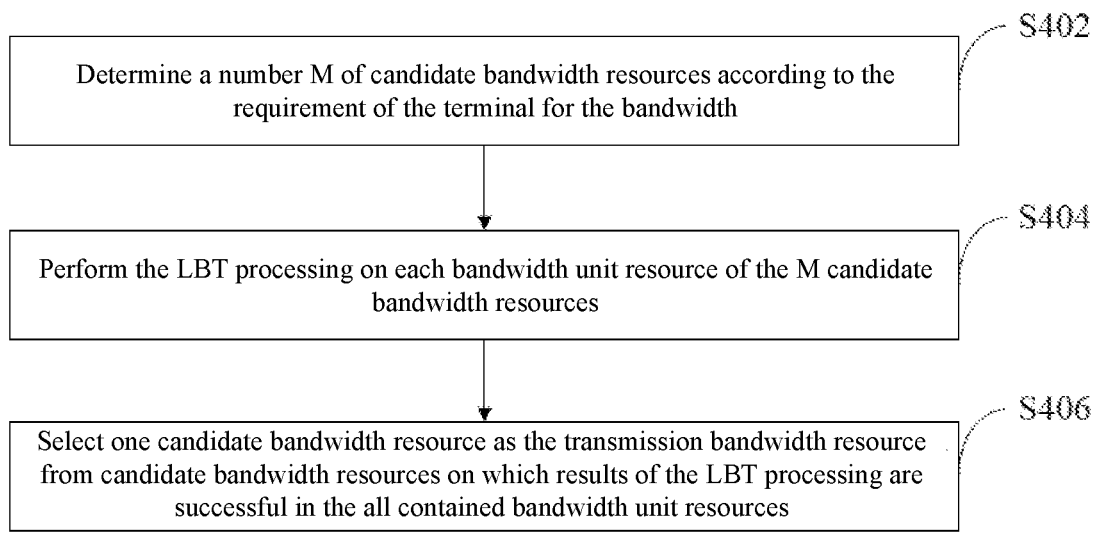
FIG. 4 is a flowchart of another scheme of LBT processing and determination of a transmission bandwidth resource provided in an embodiment.

In the above scheme, due to a fact that the supporting capacity of the terminal side for the transmission bandwidth is limited, the base station configures the transmission bandwidth resource used for the data transmission for the terminal in advance, the data transmission may be performed only when it is determined that the transmission bandwidth resource is available, and the data transmission is not performed in a case where it is determined that the transmission bandwidth resource is not available. In addition to this, for a situation that the supporting capability of the terminal side for the transmission bandwidth is fixed and limited, this embodiment further provides another scheme of LBT processing and determination of a transmission bandwidth resource, referring to FIG. 4.

In S402, a number M of candidate bandwidth resources are determined according to the requirement of the terminal for the bandwidth.

In this embodiment, a bandwidth value of each candidate bandwidth resource is equal to the bandwidth value of the transmission bandwidth resource, so that as long as results of the LBT on all bandwidth unit resources contained in a certain candidate bandwidth are successful, the candidate bandwidth resource may be used as the transmission bandwidth resource for the service transmission. In this embodiment, each candidate bandwidth resource includes at least one bandwidth unit resource, although a number of bandwidth unit resources included in different candidate bandwidth resources may be different or the same. It is readily understood that, for example, if the bandwidth value of the transmission bandwidth resource required by the terminal side is 50 MHz, then there are many ways to form the total bandwidth of 50 MHz: for example, consisting of BWP1 and BWP2 with bandwidth values of 20 MHz and 30 MHz, respectively, or consisting of BWP3 and BWP4 with bandwidth values of 10 MHz and 40 MHz, respectively; or consisting of 5 BWPs with bandwidth values of 10 MHz, respectively. In addition, there are many combination modes, which are not listed here. The bandwidth unit resources contained in the above combination modes may respectively constitute corresponding candidate bandwidth resources, such as a candidate bandwidth resource one: BWP1 and BWP2; and a candidate bandwidth resource two: BWP3 and BWP4.

In S404, the LBT processing is performed on each bandwidth unit resource of the M candidate bandwidth resources.

The base station determines M candidate bandwidth resources according to the requirement of the terminal for the bandwidth, and may perform the LBT processing on the M candidate bandwidth resources by taking the bandwidth unit resource as a unit, for example, the base station needs to perform the LBT processing on the BWP1 and the BWP2 respectively for the candidate bandwidth resource one, and if results of the LBT processing on the BWP1 and the BWP2 are successful, then it means that the candidate bandwidth resource one is free and available.

In S406, one candidate bandwidth resource is selected as the transmission bandwidth resource from candidate bandwidth resources on which results of the LBT processing are successful in the all contained bandwidth unit resources.

Assuming that a number m of candidate bandwidths remaining in the M candidate bandwidth resources are idle and available after LBT processing is performed, then the base station may select one candidate bandwidth resource from the m candidate bandwidth resources as the transmission bandwidth resource for the downlink service transmission. There are various principles for selecting the transmission bandwidth resource from the m candidate bandwidth resources, such as a random selection, selection based on CSI status information in all candidate bandwidth resources.

The two schemes described above mainly describe the manner for determining the LBT processing and the transmission bandwidth resource in a case where the support capability of the terminal side for the transmission bandwidth is limited, and the two schemes described below mainly aim at a condition that the support capability of the terminal side for the transmission bandwidth is flexible.

First scheme, the base station performs the LBT processing on the at least one continuous bandwidth unit resource in turn in a frequency band, and in a case where a result of the LBT processing on a previous bandwidth unit resource is successful, continues to perform the LBT processing on a next bandwidth unit resource until a result of the LBT processing on a certain bandwidth unit resource is failure. Then, the all bandwidth unit resources on which the results of the LBT processing are successful are jointly taken as the transmission bandwidth resource by the base station.

Figure 5:
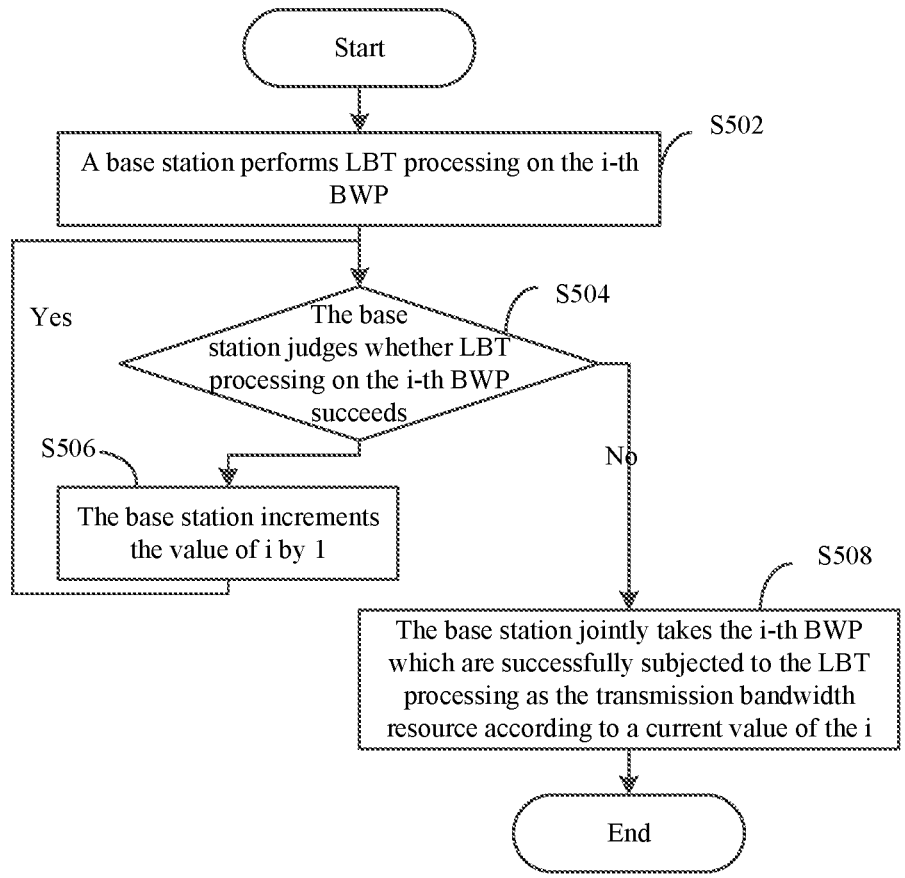
FIG. 5 is a flowchart of another scheme of LBT processing and determination of a transmission bandwidth resource provided in an embodiment.

Assuming that BWP resources such as BWP1, BWP2 . . . may participate in the LBT processing at present, and frequency bands of the BWP1, the BWP2 . . . are continuous. FIG. 5 provides a flowchart of a scheme of LBT processing and determination of a transmission bandwidth resource. Referring to FIG. 5, the scheme of LBT processing and determination of a transmission bandwidth resource provided in this embodiment includes steps described below.

In S502, the base station performs the LBT processing on the i-th BWP.

In this embodiment, the base station also determines a corresponding type of the LBT processing firstly before performing the LBT processing on each BWP, and in this example, the base station selects the LBT processing of the random backoff type and the LBT processing of the non-random backoff type for the at least two bandwidth unit resources in an interlaced manner, for example, selects the LBT processing of the random backoff type for the first BWP, selects the LBT processing of the non-random backoff type for the second BWP, and selects the LBT processing of the random backoff type for the third BWP. In addition to this manner, the base station may also determine the type of the LBT processing in other manners as described in the first embodiment, which will not be detailed herein again.

In S504, the base station judges whether a result of the LBT processing on the i-th BWP is successful.

If the result of the LBT processing on the i-th BWP is successful, then the process proceeds to S506, and if the result of the LBT processing on the i-th BWP is failure, then the process proceeds to S508.

In S506, the base station increments the value of i by 1, and then the S504 is continued to be performed.

In S508, the base station jointly takes the i-th BWP which are successfully subjected to the LBT processing as the transmission bandwidth resource according to a current value of the i.

It should be understood that a result of the LBT processing on one BWP in this scheme affects LBT processing process of a next BWP, and the whole LBT processing mechanism is timed and conditional. In some examples of this embodiment, in order to prevent the final transmission bandwidth resource from being infinitely large, or to prevent the process shown in FIG. 5 from being performed without restriction, a maximum value of i may be defined, e.g., to define that the maximum value of i cannot exceed imax, in which case the base station may also determine whether the current value of i reaches imax after performing the S506, if the current value of i reaches imax, the process proceeds to the S508, and if the current value of i does not reach imax, the S504 is continued to be performed.

Figure 6:
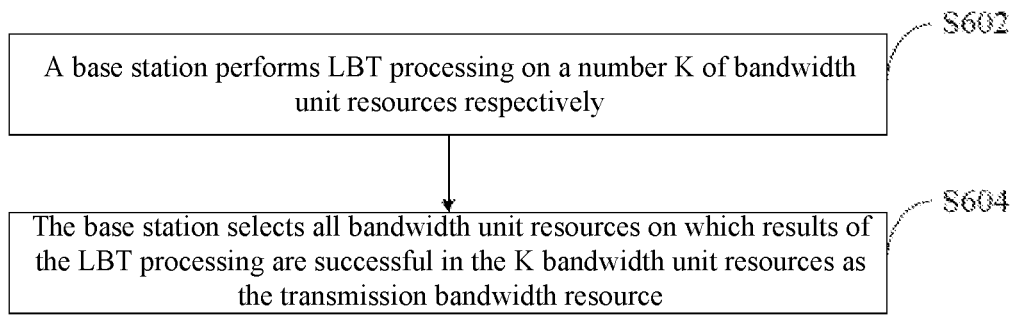
FIG. 6 is a flowchart of another scheme of LBT processing and determination of a transmission bandwidth resource provided in an embodiment.

Second scheme, referring to the flowchart shown in FIG. 6:

In S602, the base station performs the LBT processing on a number K of bandwidth unit resources respectively.

Here, K is an integer greater than 1, in some examples of this embodiment, the frequency bands of the K bandwidth unit resources are continuous, but in other examples of this embodiment, the frequency bands of the K bandwidth unit resources are discrete.

In S604, the base station jointly select all bandwidth unit resources on which results of the LBT processing are successful in the K bandwidth unit resources as the transmission bandwidth resource.

In the embodiment, the bandwidth value of the transmission bandwidth resource finally used for the service transmission is uncertain before the LBT processing, but the respective LBT processing processes of the K bandwidth unit resources do not affect each other, for example, if the K value is 10, the base station may perform the LBT processing on the 10 bandwidth resources respectively, and assuming that results of the LBT processing on the bandwidth unit resources with the serial numbers of 1, 3 and 5 are successful respectively, then the final transmission bandwidth resource is composed of bandwidth unit resources with serial numbers of 1, 3 and 5.

For the type of the LBT processing of each bandwidth unit resource in the second scheme, the LBT processing type may be determined by referring to the manner provided by the embodiment one and is not described in detail herein.

In this embodiment, execution time of the LBT processing of the non-random backoff type is generally determined based on the service transmission starting point moment T, so that the service transmission may be performed immediately after the LBT processing of the non-random backoff type is successful. However, the execution timing of the LBT processing of the random backoff type is generally irrelevant to the service transmission starting point moment T, so that after the LBT processing of the random backoff type is finished, the service transmission cannot be performed immediately even if the result of the LBT processing is successful. Therefore, no matter which of the above four schemes is adopted by the base station to perform the LBT processing and determine the transmission bandwidth resource, as long as in a case where the at least one bandwidth unit resource has at least one bandwidth unit resource on which the LBT processing of the random backoff type is performed and which has a successful result of the LBT processing or a backoff value decreased to zero, before the service transmission is performed to the terminal through the transmission bandwidth resource, it is also necessary to delay in at least one manner until the starting point moment of the service transmission T. Several such schemes are provided herein.

Scheme one, the base station automatically delays waiting until a predefined starting point moment T of the service transmission.

Scheme two, after the base station determines the starting point moment T of the service transmission, the LBT processing of the non-random backoff type is started to be performed at a moment T-t again on the at least one bandwidth unit resource on which the LBT processing of the random backoff type is performed and which has the successful result of the LBT processing or the backoff value decreased to zero, where time consumed by the LBT processing of the non-random backoff type is t.

Scheme three, the base station sends an occupation signal on the at least one bandwidth unit resource on which the LBT processing of the random backoff type is performed and which has the successful result of the LBT processing or the backoff value decreased to zero until the predefined starting point moment T of the service transmission.

This embodiment provides various schemes for determining the LBT processing and the transmission bandwidth resource, so that the base station may flexibly select according to factors such as the support capacity of the terminal side for the transmission bandwidth. Moreover, the LBT processing is performed on the bandwidth unit resource with the bandwidth value less than the system bandwidth, so that the success probability of the LBT processing is improved, and thus in a case where system hardware facilities are not changed, the system throughput is improved, and the system performance is guaranteed.

Embodiment Three

This embodiment describes a process of performing a LBT and a downlink transmission for a base station by taking a bandwidth unit resource as a BWP resource According to this embodiment. In this embodiment, replacement of the bandwidth unit resource with a minimum system bandwidth resource, a resource group, a resource block and a sub-band is also feasible.

Assuming that a transmission bandwidth of a final downlink transmission of the base station is fixed and is 40 MHz, the network side firstly configures a bandwidth of a downlink system to be 100 MHz, then the base station configures the 100 MHz bandwidth to a certain cell and divides the 100 MHz bandwidth into 4 BWPs, i.e., a BWP1 is 20 MHz, a BWP2 is 20 MHz, a BWP3 is 20 MHz, and the remaining 40 MHz bandwidth is a BWP4. The process for the downlink transmission performed by the base station may refer to following introduction.

The base station selects two continuous BWPs from the BWP1, the BWP2 and the BWP3 to perform LBT processing, or the base station directly selects the BWP4 to perform the LBT processing. For example, if the base station selects to perform the LBT processing on the BWP1 and the BWP2, the downlink service sending is performed only if the LBT processing of these two BWPs is successful, and the service sending is abandoned if the LBT processing of one of these two BWPs is unsuccessful.

The manner in which the LBT processing is performed for the BWP1 and the BWP2 may in turn be one of following manners.

First manner, the base station adopts a LBT processing manner of a type 4 for the BWP1 and the BWP2. In this way, the base station may determine a contention window when the BWP1 performs the LBT processing of the type 4 according to an access priority of a service to be transmitted on the BWP1, and then determine a backoff value according to the contention window. On the other hand, the base station determines a contention window when the BWP2 performs the LBT processing of the type 4 according to an access priority of a service to be transmitted on the BWP2, and then determines a backoff value according to the contention window. In addition, the base station may also determine a contention window and a backoff value shared by the two BWPs in combination with the access priority of the service to be transmitted on the two BWPs. The process of determining the contention window and the backoff value may refer to the introduction of the embodiment one.

When performing the 4 LBT processing of the type 4, after the random backoff value is decremented to 0, it may be necessary to perform a self-delay for a period of time (e.g., 9 us or 16 us) until a predefined starting point moment of service transmission, or to perform LBT processing of a type 2 once more after the self-delay before performing the service transmission. Or, after the LBT processing is successful, an occupation signal is sent all the time until the predefined starting point moment of the service transmission.

Second manner, the base station selects one of the two BWPs to perform LBT processing of a type 4, and performs the LBT processing of the type 2 on the other BWP.

The base station may select which BWP to perform the LBT processing of the type 4 by one of following manners:

1) one BWP is selected from the two BWPs in a uniform random selection manner;

2) a BWP with a worst CSI is selected according to a CSI of the two BWPs;

3) a BWP with a service to be transmitted of a highest access priority is selected:

4) a BWP which is initially activated or activated by default is selected.

The contention window (CW) of the BWP for performing the LBT processing of the type 4 may be maintained in such a way that: if a total proportion P of NACK responses corresponding to a physical downlink shared channel (PDSCH) received by all BWPs in a reference time slot exceeds a preset threshold value, the CW for performing the BWP of the type 4 is enlarged. In an embodiment, the base station may determine the highest access priority of the access priorities according to an access priority of a service to be transmitted on the all BWPs, and adjust the contention window of a corresponding BWP according to a contention window adjustment strategy corresponding to the highest access priority.

For a case where only 20 MHz transmission bandwidth may be supported due to a UE capability limitation, or a scenario where each UE may only activate at most one downlink BWP in the New Radio (NR) R15 phase, when scheduling service transmission of this type of UE, the base station may concentrate downlink service data of the UE into a BWP for transmission.

Embodiment Four

This embodiment describes a scenario in which a base station uses a transmission bandwidth resource with a fixed bandwidth value to perform a downlink service transmission.

Similar to the embodiment three, assuming that a transmission bandwidth of a final downlink transmission of the base station is fixed and is 40 MHz, the network side firstly configures a bandwidth of a downlink system to be 100 MHz, then the base station configures the 100 MHz bandwidth to a certain cell and divides the 100 MHz bandwidth into 4 BWPs, i.e., a BWP1 is 20 MHz, a BWP2 is 20 MHz, a BWP3 is 20 MHz, and the remaining 40 MHz is a BWP4. The process for the downlink transmission by the base station may refer to following introduction.

Figure 7:
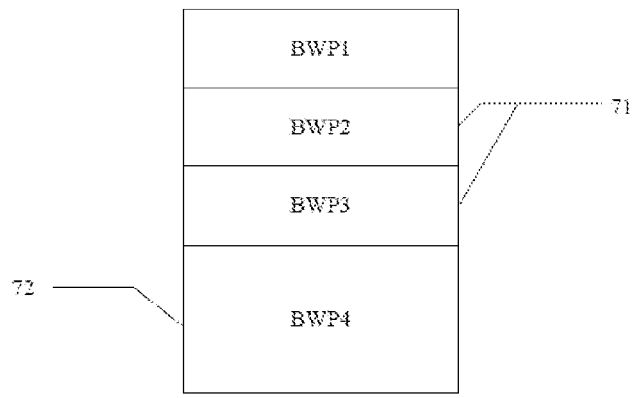
FIG. 7 is a schematic diagram of LBT processing on a BWP in multiple candidate bandwidth resources provided in an embodiment.

For example, as shown in FIG. 7, a candidate bandwidth resource determined firstly by the base station first include two, i.e., a first candidate bandwidth 71 is a combination of the BWP2 and the BWP3, and a second candidate bandwidth 72 is the BWP4. The base station may perform LBT processing on the BWP2, the BWP3 and the BWP4 respectively, and if the LBT processing fails on one or two of the BWP2 and the BWP3, while LBT processing is successful in the BWP4, the base station may only select a second candidate bandwidth resource as the transmission bandwidth resource finally. Assuming that the LBT processing succeeds on the BWP2, the BWP3 and the BWP4, then the base station may optionally select one of the first candidate bandwidth resource and the second candidate bandwidth resource as the transmission bandwidth resource. Assuming that the LBT processing succeeds on the BWP2 and the BWP3 and the LBT processing fails on the BWP4, then the base station may only select the first candidate bandwidth resource as the transmission bandwidth resource finally. Assuming that the LBT processing fails on the BWP2 and the BWP4 and succeeds only on the BWP3 is successful, in this case, the base station will temporarily not perform the downlink service transmission because no one candidate bandwidth resource is available.

Embodiment Five

This embodiment mainly introduces a scenario in which the terminal side has flexible support capability for the transmission bandwidth.

Assuming that a system bandwidth is 120 MHz, the base station configures the system bandwidth into 6 BWPs of 20 MHz (i.e., BWP1 to BWP6).

The base station may select to perform LBT processing starting from the BWP1, and after the LBT processing on the BWP1 is successful, the base station sends an occupancy signal on the BWP1 while performing the LBT processing on the BWP2. Similarly, if the LBT processing on the BWP2 is also successful, the base station also sends an occupancy signal on the BWP2 . . . and so on until the LBT processing on the BWPn is failure, where n is less than or equal to 6. Then, the base station constitutes the transmission bandwidth resource by using all BWPs on which the LBT processing is successful to transmit a downlink service.

In this embodiment, the BWP1 to BWP6 are continuous in a frequency domain, and the base station needs to perform the LBT processing on the BWP1 to BWP6 in turn, and the LBT processing may be performed on a next BWP only if a previous LBT processing is successful.

In this embodiment, the type of the LBT processing performed on these BWPs may be determined with reference to any one of following several manners.

Manner one, LBT of a type 4 is performed on the all BWPs.

Manner two, LBT processing of a type 4 is performed on one BWP (such as a first BWP or one BWP selected by other manners) of the all BWPs, and LBT processing of a type 2 is performed on the remaining BWPs.

Manner three, the LBT processing of type 4 and the LBT processing of type 2 are performed in turn, for example, the BWP1 performs the LBT processing of the type 4, the BWP2 performs the LBT processing of the type 2, the BWP3 performs the LBT processing of the type 4 in turn, . . . , in turn in a staggered manner in sequence.

In an embodiment, the occupancy signal may be at least one of a reference signal, a predefined sequence, service data to be transmitted, etc.

Embodiment Six

This embodiment continues to introduce a scenario in which the terminal side has flexible support capability for the transmission bandwidth.

Different from the scheme in the embodiment five, at most the BWPs which finally constitute the transmission bandwidth resource in this embodiment may be discrete in the frequency domain, and a LBT processing process of each BWP is independent.

For example, the base station performs LBT on three BWPs, respectively, a bandwidth value of a BWP1 is 20 MHz, a bandwidth value of a BWP2 is 40 MHz, and a bandwidth value of a BWP3 is 60 MHz. In this embodiment, these three BWPs are non-contiguous in the frequency domain, although it should be understood that in other examples, the three BWPs may also be contiguous in the frequency domain. The types of LBT processing performed on the three BWPs, respectively, may be determined based on following four manners.

Manner one, LBT processing of a type 4 is performed on each of these three BWPs.

In an embodiment, a contention window (CW) and a backoff value of each BWP in this manner may be determined in accordance with any of following manners.

First manner, for the three BWPs, respective contention windows and backoff values are determined respectively, that is, the contention windows and the backoff values based on which the three BWPs perform the LBT processing of the type 4 are not unified.

Second manner, the base station determines a unified contention window for the three BWPs according to an access priority of a service to be transmitted on the three BWPs, and determines a unified backoff value according to the unified contention window.

Manner two, one of the three BWPs is selected to perform the LBT processing of the type 4, and then the remaining two BWPs are selected to perform the LBT processing of the type 2.

For the manner two, when selecting a BWP that performs the LBT processing of the type 4, the base station may select according to following principles:

1) one BWP is selected from the three BWPs in a uniform random selection manner;
2) a BWP with a worst CSI is selected according to a CSI of the two BWPs;
3) a BWP with a service to be transmitted of a highest access priority is selected;
4) a BWP which is initially activated or activated by default is selected.

The contention window (CW) of the BWP for performing the LBT processing of the type 4 may be maintained in such a way that: if a proportion P of NACK responses received by the three BWPs in a reference time slot exceeds a preset threshold value, the contention window (CW) for performing the BWP of the type 4 is adjusted. In an embodiment, the base station may determine the highest access priority of the access priorities according to an access priority of a service to be transmitted on all BWPs, and adjust the contention window according to an adjustment strategy corresponding to the highest access priority.

Since the LBT processing procedures of the three BWPs in this embodiment are independent, a downlink transmission may be participated in after the LBT processing procedure of any one BWP is successful. In this embodiment, the base station may perform a transmission according to the UE's ability to support the transmission bandwidth, for example, for a UE with the high ability, the base station may perform the transmission by distributing multiple PDSCHs to different BWPs; for a UE with the low ability, the base station may perform the transmission by scheduling only one PDSCH on one BWP at a time.

For R15 NR, each UE may only activate one BWP, but different UEs may activate different BWPs, so that the base station may schedule transmissions of UE1-UE4 on the BWP1 and transmissions of UE5-UE7 on the BWP2.

In an embodiment, the starting point moments of service transmissions of the three BWP may be different. For example, the BWP1 is transmitted starting from a first symbol of the time slot, the BWP2 is transmitted starting from a second symbol of the time slot, and the BWP3 may be transmitted starting from a symbol 7 of the time slot.

Manner three, the three BWPs select the LBT processing of the type 4 and the LBT processing of the type 2 in an interlaced manner.

Manner four, when downlink data required to be sent by the base station is only SSB, the LBT processing of the type 2 may be performed for the three BWPs. That is, the base station performs an idle sensing once for each BWP at t us before the downlink transmission, and a value of t may be 25, 16 or 9.

Embodiment Seven

Figure 8:
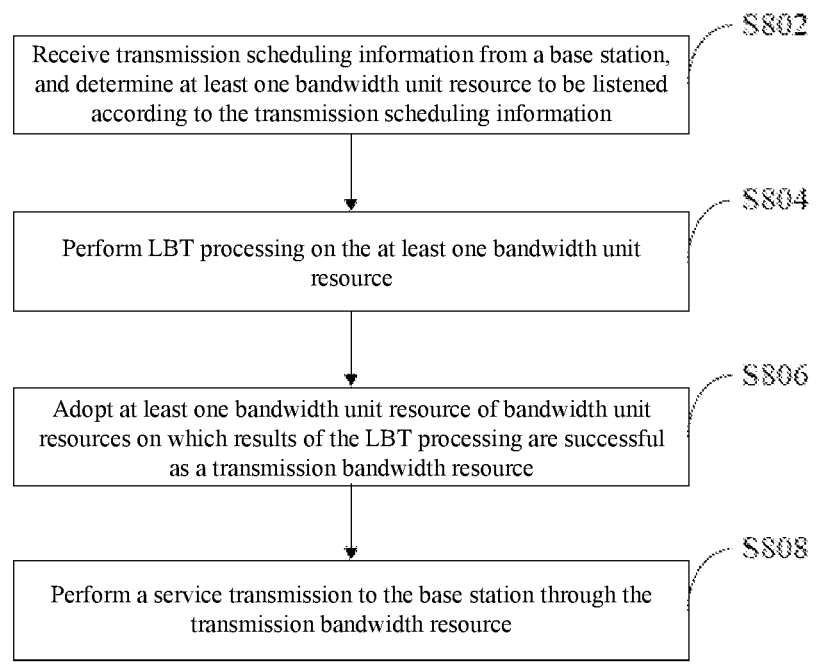
FIG. 8 is a flowchart of an uplink transmission method provided in an embodiment.

This embodiment provides an uplink transmission method, referring to the flowchart of the uplink transmission method shown in FIG. 8.

In S802, transmission scheduling information from a base station is received, and at least one bandwidth unit resource to be listened is determined according to the transmission scheduling information.

The transmission scheduling information is from the base station and may be any type of information. In this embodiment, the transmission scheduling information includes downlink control information (DCI) and/or radio resource control (RRC) information. Information for the base station to indicate the bandwidth unit resource to the terminal will typically be included in the DCI information.

In a case where an uplink transmission of the terminal only supports one bandwidth unit resource, the base station may only schedule the terminal to perform the uplink transmission on a certain bandwidth unit resource, and in this case, the terminal may determine which bandwidth unit resource to be monitored is according to bandwidth unit resource indicator information (such as BWP indicator information) in the DCI.

For a condition that the uplink transmission of the terminal only supports one bandwidth unit resource, the base station may schedule the terminal to perform the uplink transmission only on a certain bandwidth unit resource, and may also send multiple pieces of DCI information to the terminal and specify at least two bandwidth unit resources to be monitored to the terminal.

For a condition that the uplink transmission of the terminal supports more than one bandwidth unit resource, the base station may indicate at least two bandwidth unit resources to be monitored to the terminal through the transmission scheduling information.

In S804, LBT processing is performed on the at least one bandwidth unit resource.

After the terminal determines the bandwidth unit resource to be monitored according to the transmission scheduling information, the terminal may perform the LBT processing on a corresponding bandwidth unit resource. A type of the LBT processing performed on each bandwidth unit resource may be determined according to either of following two manners.

Manner one, the terminal determines the type of the LBT processing performed on the each bandwidth unit resource according to the transmission scheduling information, and the type is a random backoff type or a non-random backoff type.

Manner two, the type of the LBT processing performed on the each bandwidth unit resource is determined based on a preset rule. In an embodiment, the preset rule may refer to following examples.

In a case where the transmission scheduling information satisfies a condition one and a condition two, LBT processing of the non-random backoff type is selected for a bandwidth unit resource to be listened specified by the transmission scheduling information.

In an embodiment, the condition one includes that a scheduling transmission moment corresponding to the transmission scheduling information is in an effective maximum channel occupancy time (MCOT) initiated by a base station or a same-area terminal, and the same-area terminal is a terminal located in a same cell as a receiving object of the transmission scheduling information, i.e., a terminal located in a same cell as this terminal.

The condition two includes that the bandwidth unit resource specified by the transmission scheduling information is the same as a bandwidth unit resource used by the base station in a downlink transmission or a bandwidth unit resource used by the same-area terminal in an uplink transmission.

For example, when the base station performs the downlink transmission to the terminal, a transmission bandwidth resource constituted by the BWP1 is adopted, and the base station requires the terminal to continuously adopt the BWP1 to perform the uplink transmission at present. Meanwhile, in a process of the downlink transmission of the base station, the LBT processing of the type 4 is performed for the BWP1, a maximum channel occupancy time Tmcot corresponding to the LBT processing is 10 ms, when the base station performs the downlink service transmission, only 5 ms is taken, so that currently, 5 ms remains, the MCOT is still valid, and the terminal may continue to use the MCOT. In this case, the terminal may select to perform the LBT processing of the type 2 on the BWP1.

In a case where the transmission scheduling information does not satisfy at least one of the condition one and the condition two, LBT processing of the random backoff type is selected by the terminal for the bandwidth unit resource specified by the transmission scheduling information.

In an embodiment, if the scheduling transmission moment corresponding to the transmission scheduling information does not belong to an effective MCOT, or the bandwidth unit resource specified by the transmission scheduling information is different from the bandwidth unit resource used by the base station in the downlink transmission, and is also different from the bandwidth unit resource used by other terminals in the same cell in the uplink transmission, then the terminal cannot perform the LBT processing of the type 2 on the bandwidth unit resource specified in the transmission scheduling information, but should select to perform the LBT processing of the random backoff type on the bandwidth unit resource specified in the transmission scheduling information. For example, a BWP3 is adopted when the base station performs the downlink transmission to the terminal, and the base station performs the LBT processing of the random backoff type for the BWP3, and the maximum channel occupancy time Tmcot of the LBT processing is 10 ms. However, in the transmission scheduling information, the base station specifies the bandwidth unit resource as a BWP4, and at this time, the terminal cannot directly perform the LBT processing of the type 2 on the BWP4 regardless of whether Tmcot is still remaining, i.e., regardless of whether MCOT is still valid, but should select the LBT processing of the type 4.

In S806, at least one bandwidth unit resource of bandwidth unit resources on which results of the LBT processing are successful is adopted as a transmission bandwidth resource.

If there is only one bandwidth unit resource specified in the transmission scheduling information, then the terminal, after performing the LBT processing of a corresponding type on the bandwidth unit resource, directly takes the bandwidth unit resource as the transmission bandwidth resource if a result of the processing is successful; and the uplink transmission is not performed temporarily if the result of the LBT processing is failure.

However, if there is more than one bandwidth unit resource specified in the transmission scheduling information, then there is more than one bandwidth unit resource on which a final result of the LBT processing is successful, but a bandwidth value supported by the uplink transmission of the terminal is only the bandwidth value of one bandwidth unit resource, then the terminal needs to select one bandwidth unit resource from all bandwidth unit resources on which results of the LBT processing are successful as the transmission bandwidth resource.

if there is more than one bandwidth unit resource specified in the transmission scheduling information, and meanwhile the bandwidth value supported by the uplink transmission of the terminal is not only the bandwidth value of one bandwidth unit resource, then the terminal may jointly use the bandwidth unit resources on which the results of the LBT processing are successful as the transmission bandwidth resource.

In S808, a service transmission to the base station is performed through the transmission bandwidth resource.

When the terminal may simultaneously adopt at least two bandwidth unit resources to perform the uplink transmission, a service transmission strategy may be determined according to transmission scheduling indicator information sent by the base station, for example, the base station indicates the terminal to perform the service transmission on the at least two bandwidth unit resources, then the terminal may distribute the service to be transmitted to all bandwidth unit resources of the transmission bandwidth resource for respective sending. If the scheduling transmission information indicates that the terminal performs a same service transmission on the at least two bandwidth unit resources, then the terminal controls all bandwidth unit resources in this transmission bandwidth resource to send the same service.

For example, if the base station semi-statically configures a set including multiple BWPs, and then indicates the set to the terminal through the transmission scheduling information, then the terminal may distribute the service to be transmitted on the BWP on which a result of the LBT processing is successful after performing the LBT processing on the multiple BWPs in this set, respectively for transmission. If the base station pre-schedules a certain transport block (TB) to transmit on multiple BWPs through the transmission scheduling information, then the terminal controls all the BWPs with a successful LBT to transmit on the TB after respectively performing the LBT processing on these BWPs.

After the terminal performs the service transmission to the base station through a determined transmission bandwidth resource, if the service transmission fails, then the terminal needs to retransmit this service, and in some examples of this embodiment, in order to improve the success probability of the LBT processing in a retransmission process, the bandwidth value of the bandwidth unit resource participating in the service retransmission may be less than a bandwidth value of the bandwidth unit resource in the first service transmission.

According to the uplink transmission method provided by this embodiment, the terminal receives the transmission scheduling information from the base station, determines the bandwidth unit resource according to the transmission scheduling information, performs the LBT processing on the bandwidth unit resource, then uses at least one of the bandwidth unit resources on which the results of the LBT processing are successful as the transmission bandwidth resource, and finally performs the service transmission to the base station through the transmission bandwidth resource. Due to a fact that the terminal performs the LBT processing on the bandwidth unit resource with the bandwidth value less than the system bandwidth, compared with a condition that LBT processing is directly performed with the system bandwidth as the unit, and thus in a case where system hardware facilities are not changed, the system throughput is improved, the system performance is guaranteed, and the communication experience of a terminal side user is maintained.

In an embodiment, after the transmission of the uplink service fails, in a case where the terminal retransmits the uplink service, the bandwidth value of the bandwidth unit resource participating in the service retransmission is less than the bandwidth value of the bandwidth unit resource in the first service transmission, so that the success rate of the LBT in the service retransmission process is improved.

Embodiment Eight

This embodiment describes the uplink transmission method provided in the embodiment seven in combination with a specific example.

The following description is directed to a case that the R15 stage or the terminal has limited capability of supporting the uplink transmission bandwidth, and therefore may only perform an uplink data transmission on one BWP. In an embodiment, an uplink transmission manner of the terminal may be introduced as follows.

Manner one, the terminal determines which BWP is used by the base station for scheduling an uplink transmission according to the BWP indicator information in the DCI information, and then the terminal performs the LBT processing on the BWP. If the LBT processing on the BWP does not succeed, the transmission is temporarily relinquished; and if the LBT processing is successful, the BWP is directly taken as the transmission bandwidth resource for a service transmission.

For example, the base station indicates that the BWP2 is adopted for the uplink transmission of the terminal through the BWP indicator bit field in the DCI, the terminal only performs the LBT processing on the BWP2, and the uplink data transmission is performed on the BWP2 after the LBT processing is successful.

Manner two, the base station sends multiple DCI information to pre-schedule the terminal to perform a data transmission on two or more BWPs, the terminal respectively performs the LBT processing on these specified BWPs, since the terminal may only activate one BWP to perform the uplink transmission, so that even if the LBT processing of the multiple BWPs is successful, the terminal may only select one BWP from multiple successful BWPs to serve as the transmission bandwidth resource for the service transmission.

For example, the base station sends two pieces of DCI information to the terminal, the two pieces of DCI information pre-schedule a same data packet to be transmitted on different BWPs, or the base station sends only one piece of DCI information to the terminal, but the DCI information contains information indicating the two BWPs. Assuming that the BWP indicated by the base station pre-scheduling includes a BWP3 and a BWP4, then the terminal may perform the LBT processing on the BWP3 and the BWP4 respectively after receiving the DCI information, and if the LBT processing on one of the BWP3 and the BWP4 is successful, then the terminal performs the data transmission on the successful BWP; and if the LBT processing on the two BWPs is successful, the terminal randomly selects one BWP from the two BWPs for the data transmission.

In an embodiment, a type of the LBT processing performed by the terminal on each BWP may be determined according to corresponding indicator information in the DCI information, for example, the base station indicates to perform the LBT processing of a type 4 on the BWP3 and perform the LBT processing of a type 2 on the BWP4, and then the terminal performs the LBT processing of the type 4 and the LBT processing of the type 2 on the BWP3 and the BWP4 respectively.

Embodiment Nine

This embodiment will continue to elucidate the uplink transmission method provided in the embodiment seven in combination with a specific example.

When the terminal may support uplink transmission by adopting two or more BWPs simultaneously, for example, the terminal is relatively high in capacity and relatively large in the supported uplink transmission bandwidth, or the terminal is provided with at least two radio frequency units (RF), the terminal may perform the uplink transmission on more than one BWP simultaneously.

Before a terminal formally and simultaneously adopts multiple BWPs to perform the uplink transmission, LBT processing needs to be performed for the multiple BWPs, and only the BWP with successful LBT is selected to participate in the uplink transmission. The following introduces two schemes in which the terminal determines a type of the LBT processing on the BWP.

Scheme one, the terminal determines the type of the LBT processing performed for the BWP according to a respective LBT type of indicator information in the DCI.

Scheme two, the type of the LBT processing is determined based on a preset rule. In an embodiment, the preset rule may refer to following examples.

If a scheduling transmission moment corresponding to the transmission scheduling information is in an effective maximum channel occupancy time (MCOT) initiated by a base station or a same-area terminal, and the BWP specified by the transmission scheduling information is the same as the BWP used by the base station in downlink transmission or the BWP used by the same-area terminal in uplink transmission, then LBT processing of a non-random backoff type is selected for the BWP specified by the transmission scheduling information.

In this embodiment, if the scheduling transmission moment corresponding to the transmission scheduling information does not belong to the effective MCOT, or the BWP specified by the transmission scheduling information is different from the BWP used by the base station in the downlink transmission or the BWP used by the same-area terminal in the uplink transmission, then the terminal cannot directly perform the LBT processing of the type 2 on the specified BWP in the transmission scheduling information, but the LBT processing of the type 4 should be performed on the BWP specified in the transmission scheduling information.

In this embodiment, when the terminal formally adopts multiple BWPs for data transmission, the starting point moments of the service transmission of the multiple BWPs may be different.

Embodiment Ten

Figure 9:
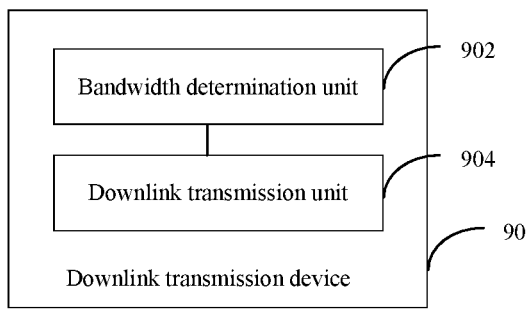
FIG. 9 is a structure diagram of a downlink transmission device provided in an embodiment.

This embodiment provides a downlink transmission device, referring to FIG. 9. The downlink transmission device 90 includes a bandwidth determination unit 902 and a downlink transmission unit 904. The bandwidth determination unit 902 is configured to perform listen before talk (LBT) processing on at least one bandwidth unit resource, and select, according to a result of the LBT processing, at least one bandwidth unit resource of bandwidth unit resources on which results of the LBT processing are successful as a transmission bandwidth resource. The downlink transmission unit 904 is configured to perform a service transmission to a terminal through the determined transmission bandwidth resource.

In one example of this embodiment, the bandwidth determination unit 902 is configured to determine a number N of bandwidth unit resources participating in the LBT processing according to a requirement of the terminal for a bandwidth, and perform the LBT processing on each bandwidth unit resource of the N bandwidth unit resources; and in a case where results of the LBT processing on the N bandwidth unit resources are successful, jointly take the N bandwidth unit resources as the transmission bandwidth resource; where N is an integer greater than or equal to 1, and a sum of bandwidth values of the N bandwidth unit resources is equal to a bandwidth value of the transmission bandwidth resource.

In one example of this embodiment, the bandwidth determination unit 902 is configured to determine a number M of candidate bandwidth resources according to the requirement of the terminal for the bandwidth; perform the LBT processing on each bandwidth unit resource of the M candidate bandwidth resources, respectively; and select one candidate bandwidth resource as the transmission bandwidth resource from candidate bandwidth resources on which results of the LBT processing are successful in all contained bandwidth unit resources; where a bandwidth value of each candidate bandwidth resource of the M candidate bandwidth resources is equal to the bandwidth value of the transmission bandwidth resource, each candidate bandwidth resource of the M candidate bandwidth resources includes at least one bandwidth unit resource, and M is an integer greater than 1.

In one example of this embodiment, the bandwidth determination unit 902 is configured to perform the LBT processing on at least one continuous bandwidth unit resource in turn in a frequency band; in a case where a result of the LBT processing on a previous bandwidth unit resource is successful, continue to perform the LBT processing on a next bandwidth unit resource until a result of the LBT processing on a certain bandwidth unit resource is failure; and jointly take all bandwidth unit resources on which results of the LBT processing are successful as the transmission bandwidth resource.

In one example of this embodiment, the bandwidth determination unit 902 is configured to perform the LBT processing on a number K of bandwidth unit resources; and jointly select all bandwidth unit resources on which results of the LBT processing are successful in the K bandwidth unit resources as the transmission bandwidth resource, where K is an integer greater than 1.

The downlink transmission device 90 is configured to implement any one of the downlink transmission methods described in the embodiments one to six, details of implementing the downlink transmission method, etc. refer to the introduction of the previous embodiments, which will not be detailed herein again. The downlink transmission device 90 may be deployed on the base station in this embodiment. In an embodiment, the functionality of the bandwidth determination unit 902 is implemented by a processor of the base station, while the functionality of the downlink transmission unit 904 may be implemented by a communication device of the base station.

Figure 10:
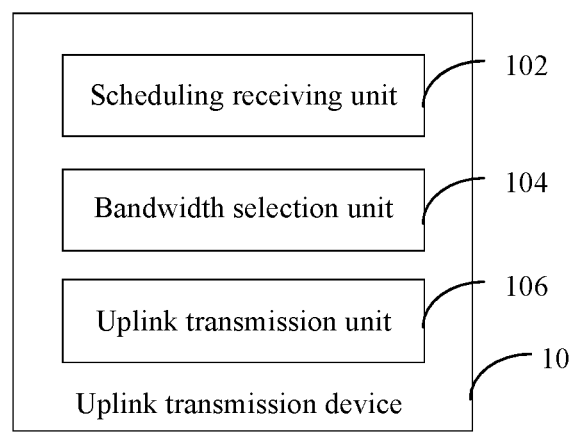
FIG. 10 is a structure diagram of an uplink transmission device provided in an embodiment.

This embodiment further provides an uplink transmission device, referring to FIG. 10, the uplink transmission device 10 includes a scheduling receiving unit 102, a bandwidth selection unit 104 and an uplink transmission unit 106. The scheduling receiving unit 102 is configured to receive transmission scheduling information from a base station and determine at least one bandwidth unit resource to be listened according to the transmission scheduling information, where a bandwidth value of each bandwidth unit resource of the at least bandwidth unit resource is less than a system bandwidth. The bandwidth selection unit 104 is configured to perform LBT processing on the at least bandwidth unit resource, and adopt at least one bandwidth unit resource of bandwidth unit resources on which results of the LBT processing are successful as a transmission bandwidth resource. The uplink transmission unit 106 is configured to perform a service transmission to the base station through the transmission bandwidth resource.

In one example of this embodiment, the bandwidth selection unit 104 is configured to: perform the listen before talk (LBT) processing on the at least one bandwidth unit resource; in a case where a bandwidth value supported by an uplink transmission is a bandwidth value of one bandwidth unit resource, select one bandwidth unit resource from bandwidth unit resources on which the results of the LBT processing are successful as the transmission bandwidth resource; and in a case where the bandwidth value supported by the uplink transmission is greater than the bandwidth value of one bandwidth unit resource, jointly take the bandwidth unit resources on which the results of the LBT processing are successful as the transmission bandwidth resource.

The uplink transmission device 10 is configured to implement any one of the uplink transmission methods described in embodiments 7 to 9, details of implementing the uplink transmission method, etc. refer to the introduction of the previous embodiments, which will not be detailed herein again. In this embodiment, the uplink transmission device 10 may be deployed on a terminal. In an embodiment, the functions of the scheduling receiving unit 102 and the bandwidth selection unit 104 may be implemented together by a communication device and a processor of the terminal, while the functions of the uplink transmission unit 106 may be implemented by the communication device of the terminal.

Besides, this embodiment further provides a storage medium, one or more computer programs capable of being read, compiled and performed by one or more processors may be stored in the storage medium, and in this embodiment, a downlink transmission program may be stored in the storage medium, and the downlink transmission program may be performed by the one or more processors to implement any one of the downlink transmission methods introduced in the previous embodiments one to six. Or, an uplink transmission program may be stored in the storage medium, and the uplink transmission program may be performed by the one or more processors to implement any one of the uplink transmission methods introduced in the previous embodiments seven to nine.

Figure 11:
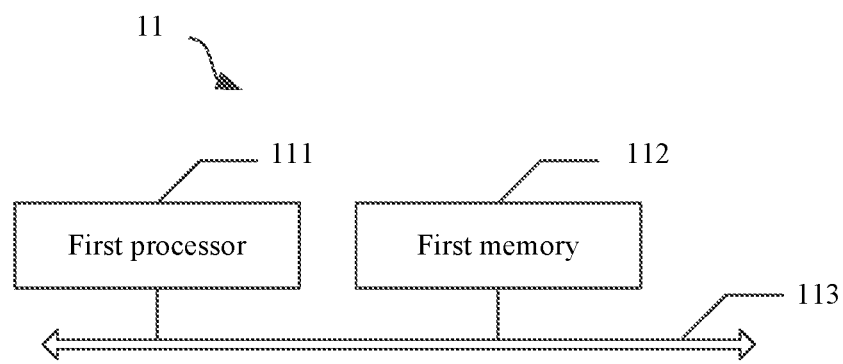
FIG. 11 is a schematic diagram of a hardware structure of a base station provided in an embodiment.

The embodiment further provides a base station, referring to a schematic diagram of a hardware structure of a base station shown in the FIG. 11. The base station 11 includes a first processor 111, a first memory 112, and a first communication bus 113 configured to connect the first processor 111 and the first memory 112, where the first memory 112 may be the storage medium storing the downlink transmission program described above. The first processor 111 may read the downlink transmission program stored in the first memory 112, compile the downlink transmission program, and perform the downlink transmission program to implement any one of the downlink transmission methods introduced in the embodiments one to six.

Figure 12:
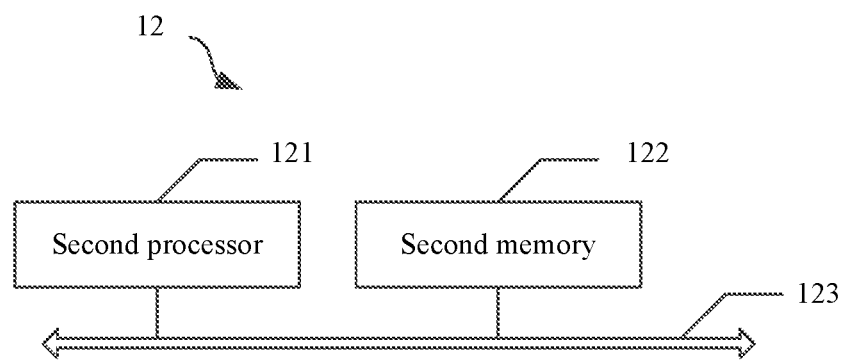
FIG. 12 is a schematic diagram of a hardware structure of a terminal provided in an embodiment.

This embodiment further provides a terminal, referring to a schematic diagram of a hardware structure of a terminal provided in FIG. 12. The terminal 12 includes a second processor 121, a second memory 122 and a second communication bus 123 for connecting the second processor 121 and the second memory 122, where the second memory 122 may be the storage medium storing the uplink transmission program described above. The second processor 121 may read the uplink transmission program stored in the second memory 122, compile the uplink transmission program, and perform the uplink transmission program to implement any one of the uplink transmission methods introduced in the embodiments seven to nine.

The details of the downlink transmission method implemented by the base station 11 and the uplink transmission method implemented by the terminal 12 refer to the introduction in the foregoing embodiments, which will not be detailed herein again.

According to the base station and the terminal provided by this embodiment, the LBT processing is performed on the bandwidth unit resource of which the bandwidth value is less than the system bandwidth, so that the success probability of the LBT processing is improved, and thus in a case where system hardware facilities are not changed, the system throughput is improved, the system performance is guaranteed, and the communication experience of a terminal side user is maintained.

The downlink transmission method and device, the uplink transmission method and device, the base station, the terminal and the storage medium provided by the embodiments of the present disclosure may not only be applied to a 5G communication system but may also be applied to any communication system in the future.

The at least one module or at least one step of the embodiments described above may be implemented by a general-purpose computing device, the at least one module or the at least one step described above may be centralized on a single computing device or distributed over a network composed of multiple computing devices. In an embodiment, the at least one module or the at least one step described above may be implemented by program codes executable by the computing device, so that the at least one module or the at least one step described above may be stored in a computer storage medium (read-only memory (ROM)/random access memory (RAM), magnetic disk, optical disk) and executed by the computing device, or the at least one module or the at least one step described above may be made into at least one integrated circuit module, respectively, or multiple modules or steps in the at least one module or the at least one step described above may be made into a single integrated circuit module. Therefore, the present disclosure is not limited to any specific combination of hardware and software.

What is claimed is:
1. A downlink transmission method, comprising:
performing listen before talk (LBT) processing on at least one bandwidth unit resource, wherein a bandwidth value of each bandwidth unit resource of the at least one bandwidth unit resource is less than a system bandwidth;
selecting, according to a result of the LBT processing, at least one bandwidth unit resource of bandwidth unit resources on which results of the LBT processing are successful as a transmission bandwidth resource; and performing a service transmission to a terminal through the transmission bandwidth resource;

wherein a manner of performing the listen before talk (LBT) processing on the at least one bandwidth unit resource, and selecting, according to the result of the LBT processing, the at least one bandwidth unit resource of the bandwidth unit resources on which the results of the LBT processing are successful as the transmission bandwidth resource comprises any one of following four manners:

manner one:
- determining a number N of bandwidth unit resources participating in the LBT processing according to an requirement of the terminal for a bandwidth, wherein N is an integer larger than or equal to 1, and a sum of bandwidth values of the N bandwidth unit resources is equal to a bandwidth value of the transmission bandwidth resource;
- performing the LBT processing on each bandwidth unit resource of the N bandwidth unit resources;
- in a case where results of the LBT processing on the N bandwidth unit resources are successful, jointly taking the N bandwidth unit resources as the transmission bandwidth resource;

manner two:
- determining a number M of candidate bandwidth resources according to the requirement of the terminal for the bandwidth, wherein a bandwidth value of each candidate bandwidth resource of the M candidate bandwidth resources is equal to the bandwidth value of the transmission bandwidth resource, and the each bandwidth unit resource of the M candidate bandwidth resources comprises at least one bandwidth unit resource, and M is an integer larger than 1;
- performing the LBT processing on each bandwidth unit resource of the M candidate bandwidth resources; and
- selecting one candidate bandwidth resource as the transmission bandwidth resource from candidate bandwidth resources on which results of the LBT processing are successful in the all contained bandwidth unit resources;

manner three:
- performing the LBT processing on at least one continuous bandwidth unit resource in turn in a frequency band, and in a case where a result of the LBT processing on a previous bandwidth unit resource is successful, continuing to perform the LBT processing on a next bandwidth unit resource until a result of the LBT processing on a certain bandwidth unit resource is failure;
- jointly taking all bandwidth unit resources on which results of the LBT processing are successful as the transmission bandwidth resource;

manner four:
- performing the LBT processing on a number K of bandwidth unit resources, wherein K is an integer greater than 1; and
- jointly selecting all bandwidth unit resources on which the results of the LBT processing are successful in the K bandwidth unit resources as the transmission bandwidth resource.

2. The downlink transmission method of claim 1, wherein before performing the listen before talk (LBT) processing on the at least one bandwidth unit resource, the method further comprises:
- determining a type of the LBT processing performed on each bandwidth unit resource of the at least one bandwidth unit resource, wherein the type is a random backoff type or a non-random backoff type.

3. The downlink transmission method of claim 2, wherein in a case of at least two bandwidth unit resources, a scheme of determining the type of the LBT processing performed on the each bandwidth unit resource comprises any one of following four schemes:
- scheme one: selecting LBT processing of the random backoff type for the at least two bandwidth unit resources;
- scheme two: selecting the LBT processing of the random backoff type for one of the at least two bandwidth unit resources, and selecting LBT processing of the non-random backoff type for the rest bandwidth unit resource;
- scheme three: selecting the LBT processing of the random backoff type and the LBT processing of the non-random backoff type in an interlaced manner for the at least two bandwidth unit resources; or
- scheme four: in a case where information to be transmitted to the terminal only comprises synchronous signal block (SSB) information, selecting the LBT processing of the non-random backoff type for the at least two bandwidth unit resources.

4. The downlink transmission method of claim 3, wherein in a case where the type of the LBT processing performed on the each bandwidth unit resource is determined according to the scheme one, performing the LBT processing on the at least one bandwidth unit resource comprises:
- determining a contention window for performing the LBT processing of the random backoff type on the each bandwidth unit resource according to an access priority of a service to be transmitted on the each bandwidth unit resource, and determining a backoff value belonging to the each bandwidth unit resource according to the contention window; and performing the LBT processing of the random backoff type on the each bandwidth unit resource according to the backoff value of the each bandwidth unit resource; or
- determining a contention window value for performing the LBT processing of the random backoff type on all bandwidth unit resources according to an access priority of a service to be transmitted on the at least two bandwidth unit resources, and determining a backoff value belonging to the all bandwidth unit resources according to the contention window value; and performing the LBT processing of the random backoff type on the each bandwidth unit resource according to the backoff value.

5. The downlink transmission method of claim 3, wherein in a case where the type of the LBT processing performed on the each bandwidth unit resource is determined according to the scheme two, before performing the listen before talk (LBT) processing on the at least one bandwidth unit resource, the method further comprises:
- selecting, in a uniform random selection manner, one bandwidth unit resource from the at least two bandwidth unit resources as a bandwidth unit resource on which the LBT processing of the random backoff type is performed; or
- selecting one bandwidth unit resource with worst channel state information (CSI) from the at least two bandwidth unit resources as a bandwidth unit resource on which the LBT processing of the random backoff type is performed; or
- selecting one bandwidth unit resource with a service to be transmitted of a highest access priority from the at least two bandwidth unit resources as a bandwidth unit resource on which the LBT processing of the random backoff type is performed; or selecting a bandwidth unit resource which is initially activated or activated by default from the at least two bandwidth unit resources as a bandwidth unit resource on which the LBT processing of the random backoff type is performed.

6. The downlink transmission method of claim 3, wherein in a case where the type of the LBT processing performed on the each bandwidth unit resource is determined according to the scheme two, the method further comprises:

maintaining a contention window of the selected bandwidth unit resource on which the LBT processing of the random backoff type is performed in a following manner:

in a case where a total proportion P of non-acknowledgement (NACK) responses corresponding to a physical downlink shared channel (PDSCH) received by all bandwidth unit resources in a reference time slot exceeds a preset threshold value, enlarging the contention window of the selected bandwidth unit resources on which the LBT processing of the random backoff type is performed, wherein $$p = \frac{\text{a number of the } NACK \text{ responses}}{\text{the number of the } NACK \text{ responses} + \text{a number of acknowledgement } (ACK) \text{ responses}}.$$

7. The downlink transmission method of claim 3, wherein in a case where the type of the LBT processing performed on the each bandwidth unit resource is determined according to the scheme two, the method further comprises:

maintaining a contention window of the selected bandwidth unit resource on which the LBT processing of the random backoff type is performed in a following manner:

determining a highest access priority according to an access priority of a service to be transmitted on all bandwidth unit resources, and adjusting the contention window of the selected bandwidth unit resource on which the LBT processing of the random backoff type is performed according to a contention window adjustment strategy corresponding to the highest access priority.

8. The downlink transmission method of claim 3, in a case where the at least two bandwidth unit resources has at least one bandwidth unit resource on which the LBT processing of the random backoff type is performed and which has a successful result of the LBT processing or a backoff value decreased to zero, before performing the service transmission to the terminal through the transmission bandwidth resource, the method further comprises:

delaying and waiting until a predefined starting point moment T of the service transmission; or after the starting point moment T of the service transmission is determined, starting to perform the LBT processing of the non-random backoff type at a moment T-t on the at least one bandwidth unit resource on which the LBT processing of the random backoff type is performed and which has the successful result of the LBT processing or the backoff value decreased to zero, wherein time consumed by the LBT processing of the non-random backoff type is t; or sending an occupation signal on the at least one bandwidth unit resource on which the LBT processing of the random backoff type is performed and which has the successful result of the LBT processing or the backoff value decreased to zero until the predefined starting point moment T of the service transmission.

9. The downlink transmission method of claim 1, wherein each bandwidth unit resource is at least one of a bandwidth parts (BWP) resource, a minimum system bandwidth resource, a resource group, or a resource block.

10. A base station, comprising a processor, a memory and a communication bus;

wherein the communication bus is configured to implement a connection communication between the processor and the memory; and wherein the processor is configured to perform a downlink transmission program stored in the memory to implement the downlink transmission method of claim 1.

11. A non-transitory storage medium, storing a downlink transmission program, wherein the downlink transmission program is executable by at least one processor to implement the downlink transmission method of claim 1.

12. An uplink transmission method, comprising:

receiving transmission scheduling information from a base station, and determining at least one bandwidth unit resource to be listened according to the transmission scheduling information, wherein a bandwidth value of each bandwidth unit resource of the at least bandwidth unit resource is less than a system bandwidth;

performing LBT processing on the at least one bandwidth unit resource;

adopting at least one bandwidth unit resource of bandwidth unit resources on which results of the LBT processing are successful as a transmission bandwidth resource; and performing a service transmission to the base station through the transmission bandwidth resource;

wherein adopting the at least one bandwidth unit resource of the bandwidth unit resources on which the results of the LBT processing are successful as the transmission bandwidth resource comprises:

in a case where a bandwidth value supported by the uplink transmission is a bandwidth value of one bandwidth unit resource, selecting one bandwidth unit resource from the bandwidth unit resources on which the results of the LBT processing are successful as the transmission bandwidth resource; and in a case where the bandwidth value supported by the uplink transmission is greater than the bandwidth value of one bandwidth unit resource, jointly taking the bandwidth unit resources on which the results of the LBT processing are successful as the transmission bandwidth resource;

wherein in a case where the bandwidth unit resources on which the results of the LBT processing are successful are jointly taken as the transmission bandwidth resource, performing the service transmission to the base station through the transmission bandwidth resource comprises:

in a case where scheduling transmission information indicates that a service transmission is performed on at least two bandwidth unit resources, distributing a service to be transmitted to all bandwidth unit resources of the transmission bandwidth resource for respective sending; and in a case where the scheduling transmission information indicates that a same service transmission is performed on the at least two bandwidth unit resources, controlling the all bandwidth unit resources of the transmission bandwidth resource to send the service.

13. The uplink transmission method of claim 12, wherein the transmission scheduling information comprises at least one of: downlink control information (DCI) or radio resource control (RRC) information.

14. The uplink transmission method of claim 12, wherein before performing the LBT processing on the at least one bandwidth unit resource, the method further comprises:
determining a type of the LBT processing performed on each bandwidth unit resource of the at least one bandwidth unit resource according to the transmission scheduling information, wherein the type is a random backoff type or a non-random backoff type.

15. The uplink transmission method of claim 12, wherein before performing the LBT processing on the at least one bandwidth unit resource, the method further comprises:
in a case where the transmission scheduling information satisfies a condition one and a condition two, selecting LBT processing of the non-random backoff type for a bandwidth unit resource specified by the transmission scheduling information; in a case where the transmission scheduling information does not satisfy at least one of the condition one and the condition two, selecting LBT processing with of the random backoff type for the bandwidth unit resource specified by the transmission scheduling information;
wherein the condition one comprises that a scheduling transmission moment corresponding to the transmission scheduling information is in an effective maximum channel occupancy time (MCOT) initiated by a base station or a same-area terminal, and the same-area terminal is a terminal located in a same cell as a receiving object of the transmission scheduling information;
wherein the condition two comprises that the bandwidth unit resource specified by the transmission scheduling information is the same as a bandwidth unit resource used by the base station in a downlink transmission or a bandwidth unit resource used by the same-area terminal in an uplink transmission.

16. The uplink transmission method of claim 12, wherein after performing the service transmission to the base station through the transmission bandwidth resource, the method further comprises:
in a case of determining that a service with a transmission failure needs to be retransmitted, retransmitting the service with the transmission failure, wherein a bandwidth value of a bandwidth unit resource participating in service retransmission is less than a bandwidth value of a bandwidth unit resource in first service transmission.

17. A terminal, comprising a processor, a memory and a communication bus;
wherein the communication bus is configured to implement a connection communication between the processor and the memory; and
wherein the processor is configured to perform an uplink transmission program stored in the memory to implement the uplink transmission method of claim 12.

18. A non-transitory storage medium, storing an uplink transmission program, wherein the uplink transmission program is executable by at least one processor to implement the uplink transmission method of claim 12.

* * * * *